United States Patent [19]

Norquest

[11] 4,416,584
[45] Nov. 22, 1983

[54] AMBIENT PRESSURE WATER TURBINE

[76] Inventor: Peter E. Norquest, P.O. Box 5501, Boise, Id. 83705

[21] Appl. No.: 182,109

[22] Filed: Aug. 28, 1980

[51] Int. Cl.³ ............................................. F01D 1/08
[52] U.S. Cl. .................................. 415/184; 415/185; 415/205; 60/398
[58] Field of Search ............... 415/183, 184, 205, 185, 415/8, 219 C, 2 A, 2 R, 3 A, 3 R, 4; 60/398

[56] References Cited

U.S. PATENT DOCUMENTS

| | | | |
|---|---|---|---|
| 11,373 | 7/1854 | Hall | 415/205 |
| 38,180 | 4/1863 | Rose | 415/219 C X |
| 54,937 | 5/1866 | Miller | 415/205 X |
| 104,199 | 6/1870 | Rapp | 415/205 |
| 235,314 | 12/1880 | Thamm | 60/398 |
| 1,003,635 | 9/1911 | Melander | 415/4 R |
| 1,650,475 | 11/1927 | Trefz et al. | 415/205 X |
| 1,661,107 | 2/1928 | Cleveland | 415/205 |
| 2,342,223 | 2/1944 | Robertson | 60/398 |
| 3,307,587 | 3/1967 | Rylatt | 415/219 C X |
| 3,965,679 | 6/1976 | Paradiso | 415/2 R X |
| 4,076,448 | 2/1978 | Sanders, Jr. | 415/205 X |

FOREIGN PATENT DOCUMENTS 309294 11/1955 Switzerland .................... 415/205

*Primary Examiner*—Philip R. Coe
*Assistant Examiner*—Frankie L. Stinson
*Attorney, Agent, or Firm*—Wells, St. John & Roberts

[57] ABSTRACT

The turbine has an ambient pressure runner rotatable about a vertical axis. An annular row of radially curved vanes extends between the runner periphery and a center discharge. A surrounding volute directs an accelerated flow of water to the runner periphery with flow conditions such that supercritical flow enters the runner and is maintained across each vane rear face. These operational conditions are dependent upon volute design, available water head values, water entry angle, number of vanes and runner vane design.

7 Claims, 13 Drawing Figures

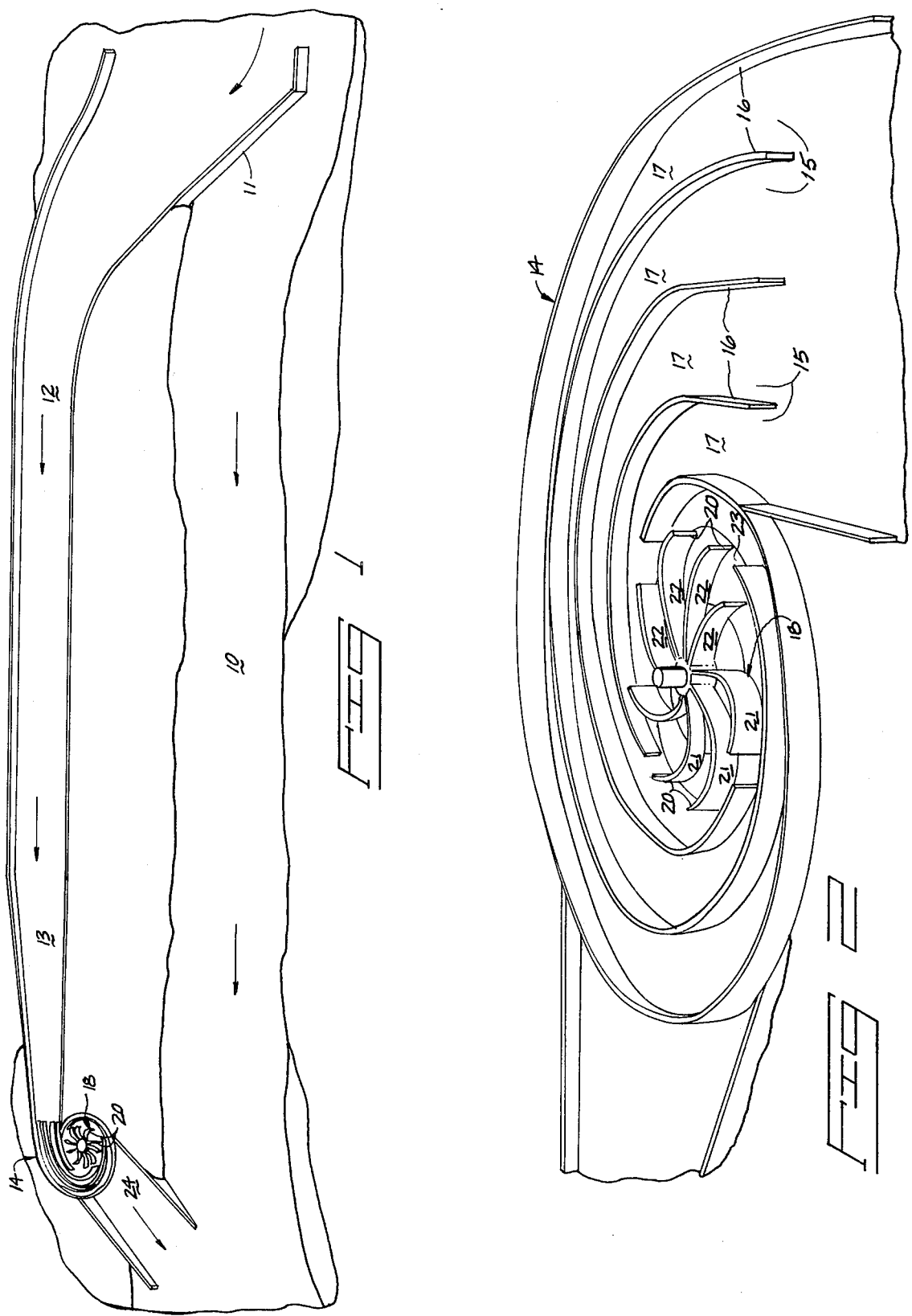

AMBIENT PRESSURE WATER TURBINE

BACKGROUND OF THE INVENTION

This disclosure relates to an ambient pressure turbine for production of efficient power from water flow heads of relatively small size. It accommodates substantial water flow and low available heads.

Turbines conventionally are classified in two primary groups, reaction turbines and impulse turbines.

The reaction turbines include the Kaplan type or propeller turbine, which is similar to the propeller of a ship operating in reverse. Water flows through the turbine and causes the propeller to rotate. The water rotates axially through the propeller and such turbines are typically referred to as axial-flow turbines. Francis or radial-flow turbines are a pressure differential turbine and divert water at right angles to the direction of entry, causing the turbine rotor to revolve. Water fills an entrance volute which surrounds the runner and then flows between fixed guide vanes to enter the runner and flow toward its center. The guide vanes largely convert the water energy into rotary motion. The vanes and runners are typically filled with flowing water and a relatively high head is required for efficient operation.

Impulse type turbines are velocity differential turbines and are represented by the Pelton wheel, which utilizes jets of water directed at cups or buckets on the periphery of a water wheel.

The present improvement uses principles involved in both reaction and impulse type turbines. In common with reaction type turbines, the water flow changes radius and direction, resulting in centrifugal forces. In common with the impulse type turbine, one of the determinants of the amount of elevation of the water on the vanes is the difference between the forward speed of the rotating vane and the velocity (under ambient pressure) of the flow entering the runner. These reaction and relative velocity characteristics are closely interrelated in the operation of the present turbine. However, by utilizing supercritical flow conditions at the vane, efficient power transfer from a volute to a runner vane is accomplished under head requirements not practically suitable for existing turbine designs.

BRIEF DESCRIPTION OF THE DRAWINGS

FIG. 1 is a schematic perspective showing use of the turbine adjacent to a river;

FIG. 2 is an enlarged schematic perspective looking toward the infeed of the turbine;

FIG. 9 is a sectional view taken along line 9—9 in FIG. 8;

DESCRIPTION OF THE PREFERRED EMBODIMENTS

Figure 3:
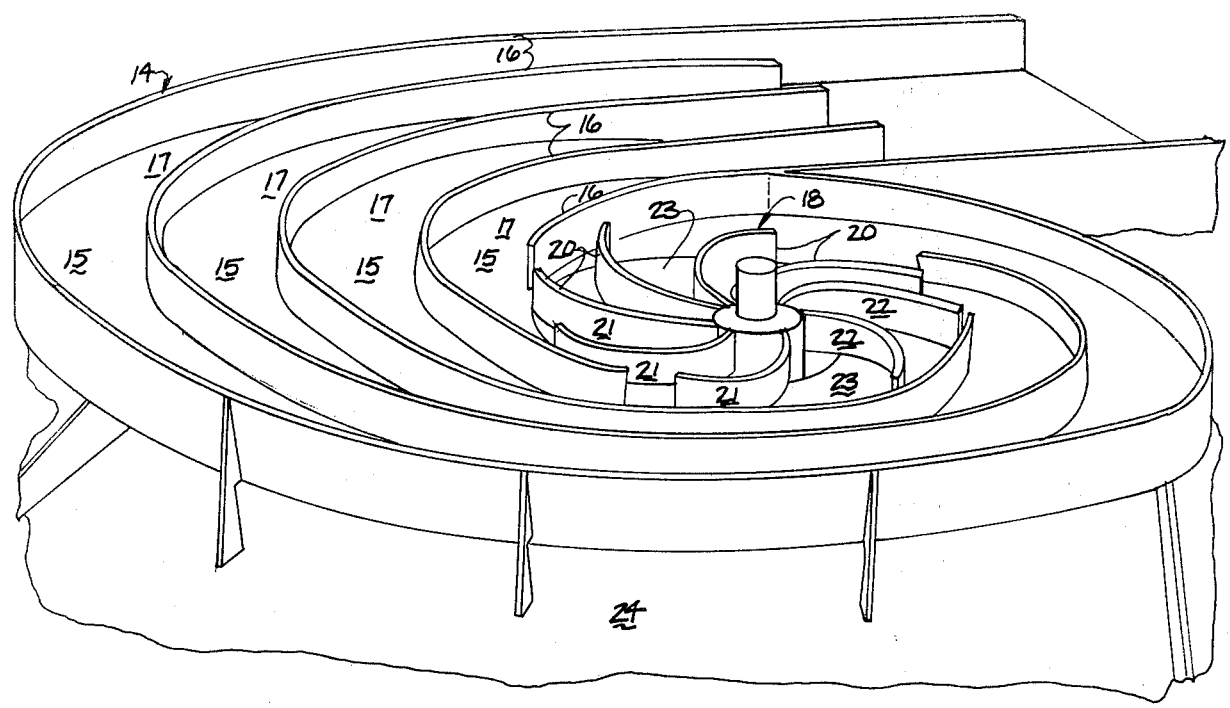
FIG. 3 is an enlarged schematic perspective looking toward the discharge of the turbine.
Figure 4:
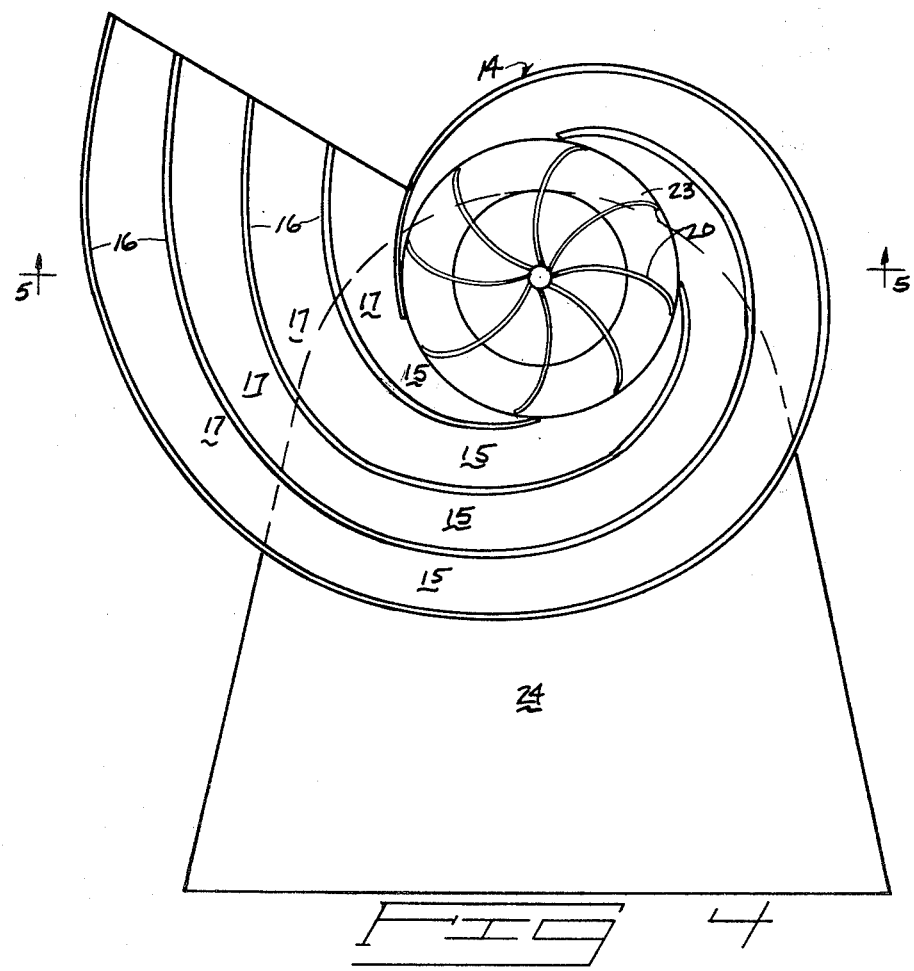
FIG. 4 is a simplified plan view of the turbine.
Figure 5:
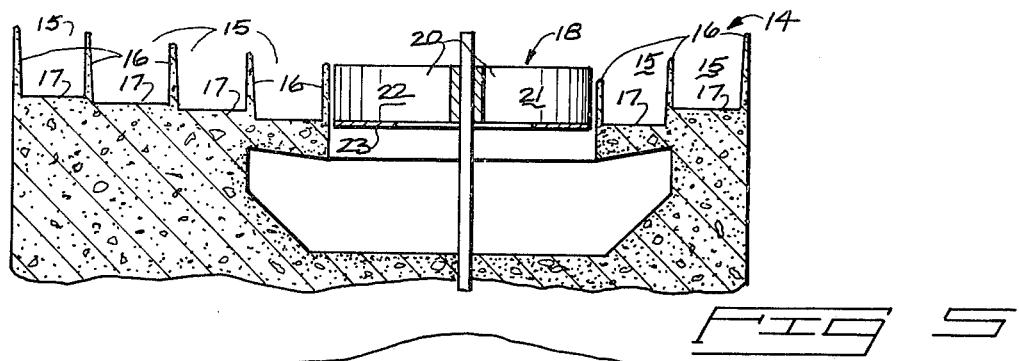
FIG. 5 is a simplified sectional view taken along line 5—5 in FIG. 4.
Figure 6:
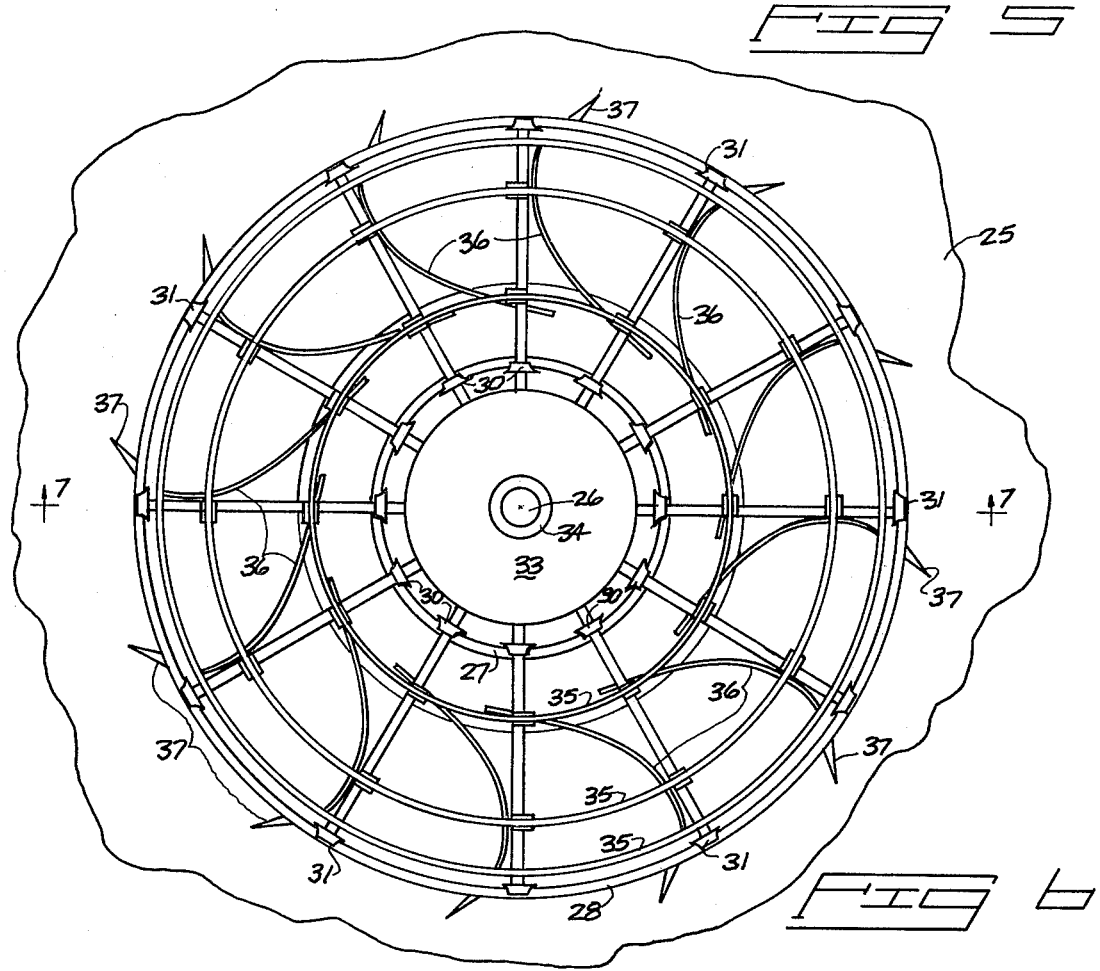
FIG. 6 is a plan view of a first structural embodiment of the turbine.
Figure 7:
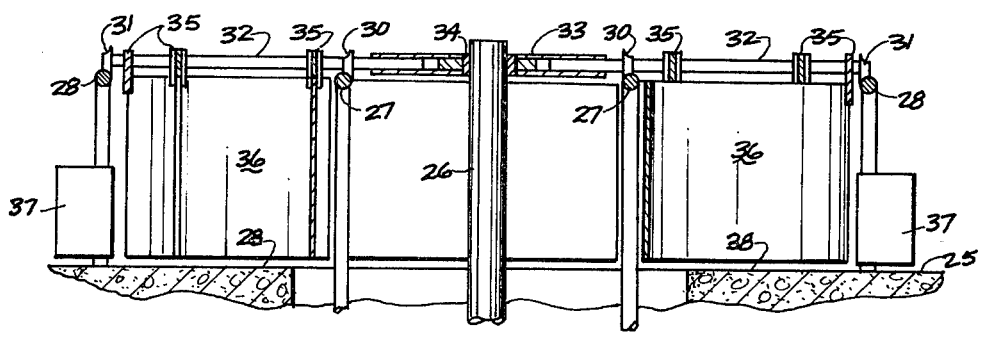
FIG. 7 is a sectional view taken along line 7—7 in FIG. 6.

The accompanying drawings illustrate the general features of the turbine in FIGS. 1 through 5. A simplified static mathematical model of water velocity and flow across the vane is illustrated in FIGS. 10 through 13. Two illustrative structural arrangements of the turbine are shown in FIGS. 6 and 7 and in FIGS. 8 and 9, respectively.

The design concept of this turbine involves the use of an open or ambient pressure turbine for development of power from a supply source of water that has a total energy head from approximately 1.0 feet to 20 feet, and flows ranging from approximately 1 cubic foot per second to 30,000 cubic feet per second.

For purposes of this disclosure, the total energy head includes the sum of the fluid heads produced by pressure and velocity plus the elevation head. The total energy head of the water at the supply source is directed to the volute. It is transformed in the volute to a maximum velocity head value at which the water is in a supercritical flow condition.

In relation to flow in open channels, "critical" flow is that regime of flow for which the specific energy of the water is minimum for a given discharge. At velocities greater than critical, the flow is typically described as being "supercritical", rapid, or shooting. In the present turbine, supercritical flow is attained at the entrance to the turbine vanes, and is maintained across the working faces of the turbine. The stiff nature of water under supercritical flow conditions is used to assure that a controlled quantity of water is maintained across the working or rear face of each vane, and substantially reduces or prevents water contact with the front face of the following or succeeding vane. The turbine is not completely filled with water, as is conventional with enclosed radial flow turbines.

The turbine has been designed to obtain maximum power from low energy head water supplies by processing large quantities of water in relation to the heads used. It is an ambient pressure water turbine with characteristics of both impulse turbines and mixed flow reaction turbines. It can permit use of otherwise unusable flows or rivers by constructing a diversion and canal system for obtaining the required energy head. It also can be used in conjunction with small drops in existing irrigation canals having energy head ranges below the effective requirements of existing turbines.

The turbine design uses a velocity head approach and supercritical flow through the turbine vanes. Water is supported on the vanes by a runner floor that rotates in unison with them or is separate and stationary. Power generation can be achieved through a ring spur gear drive to an induction alternator or other generating equipment. Smaller units can utilize a center support shaft for the runner. In larger sizes, the design can provide for a peripheral track and roller support with top-mounted vanes and a stationary runner floor. A portion of the large diameter runner floor might also revolve with the vanes.

The vanes are designed to obtain a maximum water directional change and a resultant water elevation and static pressure change within the runner of the turbine.

The water enters the runner at a given distribution depth and flows along the rear face of each vane, increasing in elevation to a location of maximum centrifugal effect. This substantially reduces or eliminates water contact with the forward faces of the succeeding vanes. Discharge at the center of the turbine is a combined axial and rearward tangential flow, with the required cross-sectional dimensions being determined by this flow so as to not impede it in any way.

The infeed volute flutes which lead to the runner define multiple chutes that increase the water velocity to the maximum obtainable value for the particular flow requirements and provide supercritical flow conditions across the rotating vanes. The volute configuration also assures even water velocity and distribution at the runner periphery. Seasonal flow variations of 50 to 75% of the maximum design flow can be accommodated by use of head control gates leading to the volute or by closing off alternate chutes leading to the runner periphery.

Referring now to FIGS. 1 through 5, the turbine is generally illustrated in a simplified form. No connection is shown to a power generator, and it is to be understood that the mechanical drive to the generator unit can be at a central turbine shaft, at a ring gear at the outer periphery of the runner or at a rotatable power connection at any other point about the runner. The mechanical interconnection to the generator unit is of no consequence with respect to the understanding of the present invention.

As shown, the turbine can be used alongside a river or canal 10. It is assumed that the total energy head along the selected stretch of river 10 is inadequate for conventional turbine generating facilities. However, there are many stretches along rivers and canals where large flow is available at a relatively low energy head. It is this combination of available water energy to which the present invention effort has been directed.

Water is diverted from river 10 by an upstream diversion wall or dam 11 that directs a portion of the water into a power canal 12. The width of the power canal 12 is less than the width of the diverted river water, which increases water speed and allows a smaller canal structure to meet the volume requirements of the downstream turbine assembly.

The power canal 12 must be designed in shape and size so as to be capable of maintaining the required maximum constant flow of water along its full length without impeding water velocity. The slope of the power canal 12 is typically more shallow than that of the normal adjacent ground and river slope permitting canal 12 to gain elevation in relation to river 10. As shown, the power canal 12 will typically run parallel to the adjacent bank of the river 10. The length of the canal 12 is determined by the amount of elevation required through the turbine.

A second contraction in width is provided at the downstream end of the power canal 12 at a volute transition area 13. This reduction in width further increases water velocity. It is preferred that the water velocity along the canal 12 reach the critical stage for the particular depth of water just prior to entering the volute 14. It must achieve supercritical flow prior to entrance onto the runner.

As the water enters volute 14, it begins a descent along a steeper slope within individual chutes 15. Chutes 15 are bounded by upright flutes 16 arranged in a converging spiral pattern leading to open inner ends spaced equiangularly about the runner periphery. This descent results in supercritical flow conditions.

The chutes 15 lead to the circular periphery about the rotatable runner 18, which rotates about a center vertical axis. The inner end of each chute 15 preferably terminates along a horizontal floor section to provide a constant initial depth of water having a substantial rectangular cross-sectional shape between each set of adjacent runner vanes 20.

Water enters runner 18 in a supercritical flow state and maintains this state at all times while in contact with the rear faces 21 of the respective vanes 20. The supercritical flow condition is assured by proper control of incoming water flow rate, water velocity at the discharge of volute 14 and the approach angle of the water along the guide vanes or inner ends of flutes 16 in relation to the periphery of the runner 18. Control of these factors also assures that the backwater line of the water moving across the rear face 21 of a vane 20 substantially reduces or prevents water contact with the adjacent front face 22 of the succeeding vane. The minimal contact between the water flowing through runner 18 and the vane front faces substantially reduces or eliminates back pressure of water against the vanes, which would create an energy loss within the turbine. The effective pressure of the water against each vane is therefore proportional to the full depth or height of the water across rear face 21. Counteraction by the water depth and back pressure against the succeeding vane front face is substantially reduced or prevented altogether.

Water is supported elevationally across the vanes 20 by a runner floor 23. Runner floor 23 is annular and can be either stationary and separately supported beneath vanes 20 or can be fixed to vanes 20 so as to rotate in unison with them. The annular width of the runner floor 23 defines the effective radial working width across the vanes 20. Water exits the runner 18 through the center of the turbine by dropping axially from the runner floor 23. It is received gravitationally within a recessed discharge canal 24 which returns it to river 10 at close to its original velocity. The discharge from the turbine can also be fed to a second downstream turbine, which would require additional elevation and canal length, but would permit further power production from a single diversion.

Figure 8:
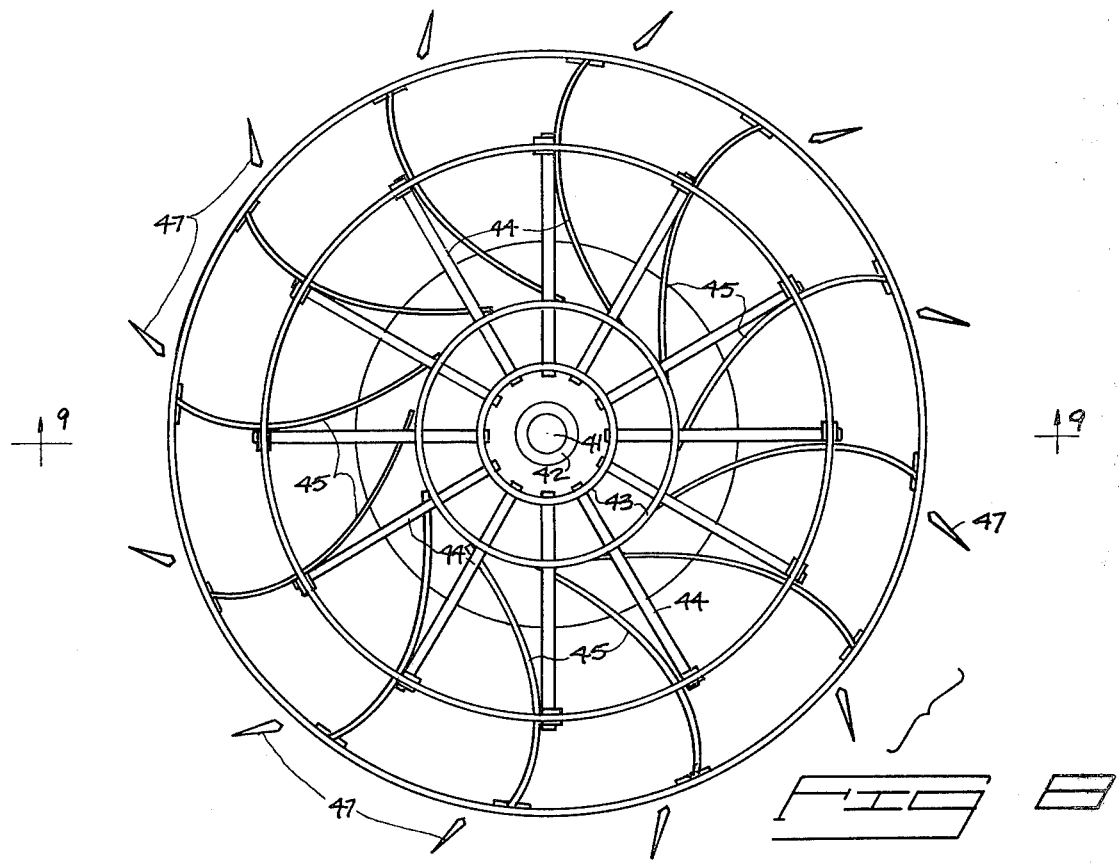
FIG. 8 is a plan view of a second structural embodiment.
Figure 7:
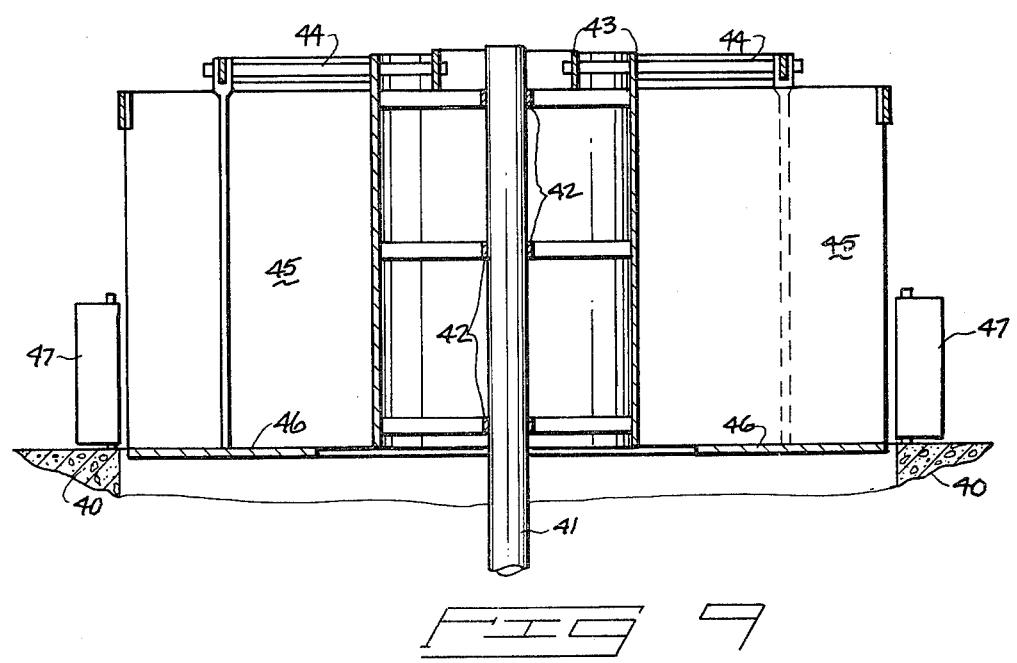

The above-described general design concepts are specifically incorporated into structural arrangements of the turbine as illustrated in FIGS. 6 and 8. FIG. 6 shows a relatively large diameter apparatus with track and roller supports for the vanes. FIG. 8 shows a smaller unit with a central shaft support. Both operate according to the principles described above.

FIG. 6 shows a recessed base 25 which supports a fixed central shaft 26 and concentric inner and outer stationary circular tracks 27 and 28. The tracks 27, 28 are respectively engaged by inner and outer sets of rollers 30, 31 rotatably journalled about radial shafts 32. Shafts 32 are connected to a central hub 33 mounted about shaft 26 by bearings 34. The shafts 32 form a radial spider or frame and are fixed apart by circular frame members 35 which suspend the individual vanes 36. Adjustable guide vanes 37 are arranged about the periphery of the runner to permit adjustment of the entry angle of the water at the discharge of the volute. The runner floor 38 is stationary and is formed about the open section of the base 25 that defines the discharge canal beneath the runner. Floor 38 is an open horizontal annular surface.

FIG. 8 shows a similar base 40 and a fixed center shaft 41. In place of the tracks and rollers, the runner frame is rotatably journalled about the shaft 41 by a series of bearings 42 and hubs 43. The rigid runner frame, including radial members 44, fixedly supports the individual vanes 45 in an open radial structure. The runner floor 46 in this example is fixed to the runner frame and vanes 45 to rotate in unison with them. Adjustable guide vanes 47 (optional) are again shown about the periphery of the runner outwardly adjacent to the runner vanes 45.

The ambient pressure water turbines described herein incorporate characteristics of both reaction and impulse turbines, which will vary somewhat depending upon selected runner width and vane configuration. Its operating efficiency depends substantially upon the achievement of a significant pressure differential within the runner between the rear face of each vane, which is contacted by the moving water at supercritical flow conditions, and the front face of each vane, which is substantially or totally clear of water contact.

The energy developed by the water within volute 14 is gradually changed, due to elevation changes, to a maximum velocity head for the flowing depth of water that is being delivered to the runner. This is achieved by designing each chute 15 to have progressively lowered elevation and progressively reduced width in the direction of the water flow. The diversion, power canal and volute are designed to achieve maximum water velocity at the inner ends of the volute chutes with respect to the available flow and elevation head at the river or other supply of water in hydraulic communication with volute 14.

As the water, at supercritical flow conditions, travels across the rear face 21 of each moving vane 20, it is free to change its cross-sectional dimensions on the vane. These changes occur in response to changes in the direction of the water floor as it traverses the curved vane surface. The resulting cross-sectional area of the water is determined by the elevation of the water due to centrifugal forces as its direction of movement changes. The superelevation of water on the vane can be approximately forty percent greater for supercritical flow than subcritical flow.

Figure 13:
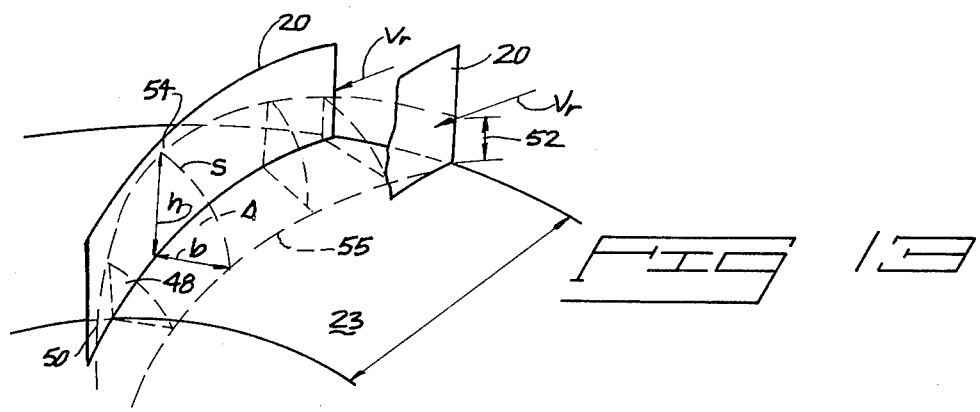
FIG. 13 is a perspective view of a vane, illustrating the water configuration flowing across it.

The height of each vane above the runner floor must be designed to accommodate possible changes in water cross section (see FIG. 13). In general, since superelevation can occur, the maximum elevation of the rear face of each vane should be greater than the average depth of water directed onto the runner floor at the periphery of the runner by the infeed volute. It should have sufficient elevation above the runner floor to accommodate the maximum resulting superelevation of the water against the vane.

The high inertia of the water entering the runner causes a centrifugal action on the vane. The entry of the water at the exit of volute 14 is in an angular direction determined by the resultant vector of the tangential water velocity of the chute and the gravitational acceleration in a radial direction. In addition, the adjustable guide vanes arranged about the runner are preferably set at an angle to impart a definite radial component of movement to the entering stream of water. They should be set to streamline the flow of water and prevent energy losses due to the resultant shock that would otherwise be caused by an abrupt change of water direction. Tests have shown that there is no tendency for the water to be reflected with a radially outward component. As the water velocity along the curved vane is greater than the tangential movement of the vane, the water is forced inward through the runner with an increasing radial component to a point along each vane where it is turned and this radial component becomes an increasing tangential vector in a negative direction. This vector is dependent upon the discharge vane angle at the inner vane end 48. The radial width of the runner floor 23 beneath the vanes 20 should be adequate for maintaining water against the back face of the vane through a maximum directional change to its discharge at the inner vane end 48.

It is to be noted that there is no rapid directional change of the water as its enters the runner, nor is there any rapid directional change of the water along the width of the vanes. The vanes are arranged about the runner to provide smooth entry of water from volute 14.

Although frictional flow losses are related to the square of the water velocity, the range of water velocities contemplated in use of this turbine are not extremely high and the frictional losses will be relatively small, due primarily to the relative roughness in relation to the volume of water.

FIGS. 10 through 13 diagrammatically illustrate the mathematical theories relating to superelevation of the water across the individual vanes. The hypothetical example used in this model is a runner having an outside diameter of 75 feet and 24 vanes. The vane radius (r) across the runner floor is 10 feet and the minimum distance between the vanes is 9.81 feet. The flow entering the runner is assumed to be 12,544 cubic feet per second. 522 cubic feet per second of water will be directed onto each vane.

Figure 10:
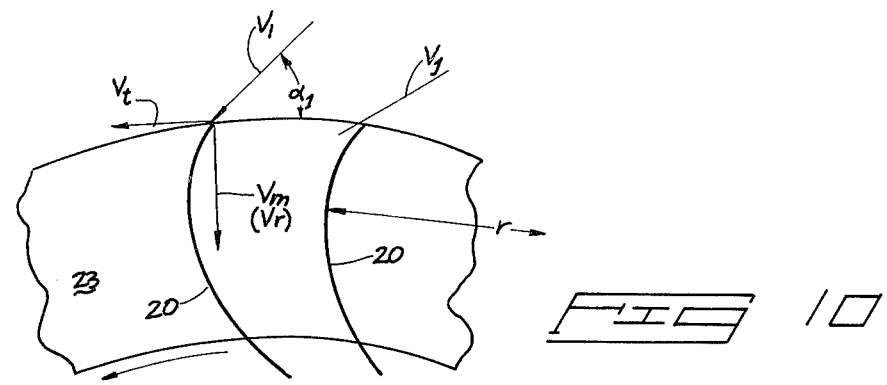
FIG. 10 is a schematic plan view showing velocity vectors at the turbine vanes.

As shown in FIG. 10, the water enters the runner at an angle of 40° from a line tangential to the runner periphery. In the illustrated example, the absolute velocity of the water entering the runner ($v_l$) is 24 feet per second. The tangential component of this velocity ($v_t$) is 18.4 feet per second. The radial component of water velocity at the entrance to the runner ($V_m$) is 15.4 feet per second. Relative velocity ($V_r$) is identical to radial velocity of this location.

Figure 11:
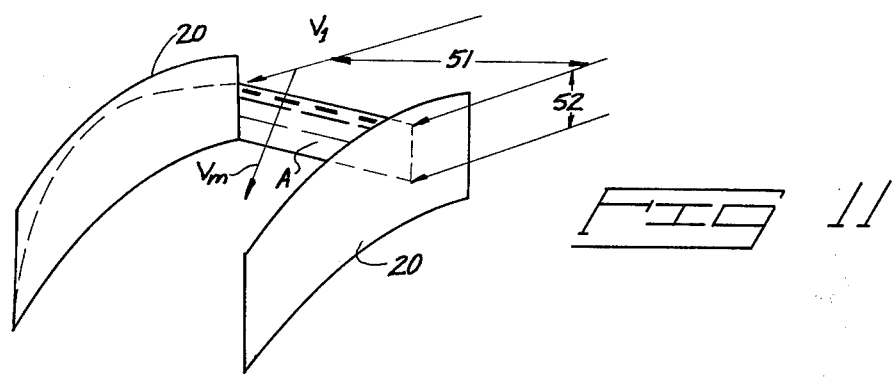
FIG. 11 is a schematic perspective view of a vane showing the area of water delivered thereto.

The radial flow width entering the runner between successive vanes is equal to the vane separation at entry (9.81 feet). The absolute entry flow width 51 will be approximately sine $\alpha_1$ times the radial flow width, or 6.3 feet (FIG. 11). The water depth 52 at entry equals the total flow per vane (522 CFS) divided by the absolute entry velocity (24 feet per second) times the absolute entry flow width, or 3.45 feet. This is the pressure head of the incoming water delivered to the runner. The area cross section (A) of the entering water is the pressure head or entry water depth (3.45 feet) multiplied by the absolute entry flow width (6.3 feet), or 21.73 square feet.

Figure 12:
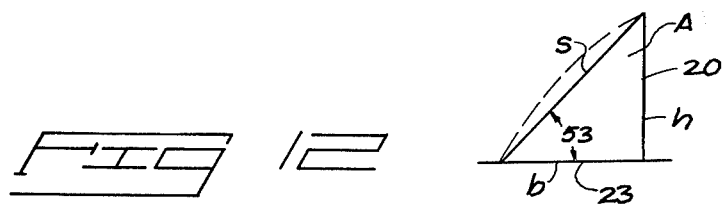
FIG. 12 is a simplified schematic view illustrating the superelevation slope across the vane.

Referring to FIG. 12, one can approximate the slope(s) or tangent of angle 53 by use of the supercritical superelevation formula:

$$s = 2 \frac{V_r^2}{gr}$$

where: g is the acceleration force of gravity (32.2 feet per second square), $V_r$ is the relative velocity, and r is the radius of curvature of the vane. Applying this formula to the above figures:

$$s = \frac{2(15.4)^2}{32.2(10)} = 1.473$$

By simple trigonometry based on an approximate right triangular cross section, the height (h) and the base (b) can be calculated as follows $$h = \sqrt{2As} = \sqrt{2(21.73)(1.473)} = 8.0 \text{ feet}$$

$$b = \frac{h}{s} = \frac{8.0}{1.473} = 5.43 \text{ feet}$$

As shown in FIG. 13, the incoming water resting against the rear vane face and runner floor will gradually "climb" the vertical face as it traverses the vane, to an apex at which its height and width will approximate the above calculations. The water height will then taper off until it drops from the inner annular edge of the runner floor or an equivalent extension. The highest point on the simulated water path is designated by the reference numeral 54.

The ideal amount of superelevation required in the water as it crosses each vane back surface must be sufficient to prevent the backwater line 55 from contacting the forward face of the following vane. The amount of superelevation is partially dependent upon the entry water velocity at the periphery of the runner. Secondly, the superelevation of the water will also be dependent upon the rate of forward motion of the vane, due to revolution of the runner about its central axis, since the ability of the water to climb the vane face depends upon relative velocity values. The superelevation is also a function of the radius or curvature of the vane in the radial direction with respect to the runner axis and the entry angle of the incoming water ($\alpha_1$). The water entry angle for smooth entry determines the amount of forward motion imparted to a vane by the impulse forces of the water as well as the resultant relative velocity of the water across the vane surface it contacts.

In general, as the water flows across a vane, an upward axial velocity component is imparted to the water due to the superelevation forces discussed above. This upward water flow vector is unique to this particular turbine structure and method of operation. Conversely, at its discharge from the vane, the water achieves a downward axial component of flow or downward relative velocity which carries it into the receiving tail race. Because of the vane curvature, the discharged water also has a negative relative velocity component directed opposite to the direction of rotation of the runner, which has been imparted to it by the vane curvature or radius.

Head attainment methods or systems which might be utilized upstream of the volute may be divided into four categories: the use of a dam or other impounding structure, the use of an existing canal having an elevation drop, the use of a diversion structure and power canal, and the use of a power canal without a diversion structure. As used herein, head attainment refers only to the method used for providing a supply of water, regardless of the combination of heads used at the volute entry, which might include the pressure head, the velocity head and elevation.

The values given each available head entering the volute will necessarily be determined by the best possible combination at the site selected, taking into consideration the available flow of water, flow variations, and relative elevations between the source and volute.

The volute provides a 360° flow entry onto the runner periphery. Its overall design, and its size, will be determined by the combination of available heads at its entry and the total flow of water. The chutes defined by the upright flutes supply water flow to the runner in equal amounts at equiangularly spaced discharge locations arranged about its periphery. The flow of water to the runner is supplied at approximately the same velocity at each angular location about it. The flutes also serve to reduce the amount of superelevation of the water that occurs within the volute structure itself.

The descending elevation of the chutes prevents water from backing up due to the deceleration that would occur if the floor were level. The minimum slope used should be sufficient to prevent the water from attaining uniform flow prior to reaching the runner periphery. The sloped floors of the individual chutes permit much larger flows through the volute than would otherwise be possible.

Superelevation through the chutes, which is considered detrimental to the achievement of even flow distribution of water onto the runner, is reduced by using a transition curve with the proper length and radius from entry in the direction of flow. This reduces the amount of superelevation of supercritical flows to that which would be expected with a subcritical flow.

The final transition portions of the chutes immediately prior to discharge of the water flow onto the runner provide an even depth and velocity distribution of water under supercritical flow conditions. The volute design must control outside superelevation along the curved flutes and provide a smooth transition from each chute to the runner. The volute also must assure equal distribution of water flow with respect to both depth and velocity at all points about the runner periphery. Shock losses which may occur due to final directional changes at the guide vanes or exits of the chutes should also be minimized.

To design a turbine system for accommodating seasonal flow fluctuations, efforts must begin with the environmental considerations for a particular installation site. If a power canal system is used, with or without a diversion structure, the minimum flow requirements for the section of stream affected must be considered. If a head attainment structure is used, impoundment and its related problems must be considered.

If a diversion system is used, the flow into the system will typically allow for a minimum flow bypass downstream for the length of the power canal. Therefore, minimum seasonal flow less the required minimum stream flow will determine the maximum design limits of the system, provided the user is seeking a constant power output. Where the power output is variable, the maximum design limits can be increased to the maximum seasonal flow in the canal less the required minimum stream flow.

Flow control for the turbine is limited to a diversion system. However, two methods of head control have been designed into the system. First, the multiple channel volute permits the closing of alternate chutes for operation of the turbine at the same total heads with reduced amounts of flow. Second, variable sloped weirs (not shown) can be provided to vary the head upstream from the volute by raising or lowering the effective floor elevation of the volute entry. In this way, one can maintain the same total head using all channels during reduced flow conditions. Both methods could be used simultaneously under extreme flow variations. Either method helps to maintain the desired final velocity of the water as it is fed onto the runner to assure constant speed of revolution of the runner itself.

The turbine described above has been found to successfully attain relatively high efficiencies from very low heads in the water supply, using high velocities, supercritical flow, and superelevation of the water along the runner vanes. By using the optimum flow entry angle, runner vane radius and curvature, runner rotational speed, and number of vanes, the resulting superelevation of the water across the vanes will substantially reduce or prevent any back pressure from occurring at the forward faces of the vanes. Supercritical flow across the vanes can result in superelevation on the rear face of each vane approximately 40% greater than that achieved under subcritical flow conditions.

As the turbine will typically have a relatively slow rotational speed of about four to fifty revolutions per minute, dependent upon its physical size, a power transfer method providing for a speed increase to a generator is necessary. This can be in the form of a spur ring gear driving a smaller gear. The ring gear can be attached directly to the structure of the runner. The ring gear will also permit the driving of more than one power generator unit on a single runner and make it possible to also drive pumps directly in addition to power generation systems. Smaller turbine units may use a chain or belt drive to the systems being driven.

Various modifications can be made in the structure without deviating from the basic concepts described above.

Having described my invention, I claim:

1. An ambient pressure water turbine for use in conjunction with a low total energy supply of water, comprising:
    runner means for receiving water exposed to ambient atmospheric pressure, said runner means being mounted for rotational movement about a central vertical axis;
    a plurality of vanes fixed about said runner at equally spaced locations about said central vertical axis, each vane extending outward relative to said central vertical axis from an inner vane end to an outer vane end, each vane having an upright rear face extending between its ends, and further being provided with an oppositely directed front face;
    runner floor means located directly beneath the vanes for elevationally supporting water flowing along each vane;
    water discharge means positioned beneath said runner in open hydraulic communication with the inner vane ends for freely receiving water from the inner vane ends;
    and infeed means operably interposed between the supply of water and the runner periphery, said infeed means comprising a series of spiral chutes for conveying water under ambient atmospheric pressure in hydraulic communication with the supply of water and leading toward inner chute ends circumferentially spaced about and radially adjacent to the runner periphery, each chute having both progressively lowered elevation and progressively reduced width in the direction of the water flow for increasing the water velocity to the maximum obtainable value for the flowing depth of water being delivered to the runner and for directing the water onto the runner floor means at a flow rate and angle relative to the runner periphery such that the water enters the runner in a supercritical flow condition and is maintained in such condition as it traverses the runner floor means while in contact with the rear faces of the respective vanes, the minimum slope of the ambient atmospheric pressure chutes being sufficient to prevent the water from attaining uniform flow prior to reaching the runner periphery.

2. A turnbine as claimed in claim 1 wherein:
    the radial width of said runner floor means beneath the vanes is adequate for maintaining water against the back surface of each vane through a maximum directional change along the vane prior to delivery to said water discharge means.

3. A turbine as claimed in claim 1 wherein the rear face of each vane is a smooth upright wall having sufficient radial curvature to attain maximum water directional change prior to delivery of water to said water discharge means and sufficient vertical height to accommodate increases in water elevation across the vane due to the centrifugal action resulting from the relative velocity component of water along the vane.

4. An ambient pressure water turbine as set out in claim 1 capable of developing power from a supply of water having a total energy head of 1.0 to 20 feet, and flows ranging from approximately 1 cubic foot per second to 30,000 cubic feet per second.

5. An ambient pressure water turbine as set out in claim 1 wherein the maximum elevation of the rear face of each vane is greater than the average depth of water delivered to the runner floor means by said infeed means.

6. An ambient pressure water turbine as set out in claim 1 wherein the maximum elevation of the rear face of each vane is greater than the average depth of water delivered to the runner floor means by said infeed means and has sufficient elevation above the runner floor means for accommodating the maximum resulting superelevation of the water against the vanes.

7. An ambient pressure water turbine for use in conjunction with a low total energy supply of water, comprising:
    horizontal runner means having a circular periphery for receiving water exposed to ambient atmospheric pressure;
    means mounting said runner means for free rotational movement about a vertical axis centered within the periphery;
    a plurality of upright vanes fixed about the runner means and extending outward relative to said axis from an inner vane end to an outer vane end, each vane having opposing front and rear faces;
    annular runner floor means located directly beneath the vanes for elevationally supporting water as it flows along each vane;
    gravity water discharge means beneath the runner means for receiving water from the inner vane ends;
    and infeed means for constantly directing a supply of water under ambient atmospheric pressure to the outer end of the rear face of each vane at a flow rate and angle such that the rear face is constantly contacted by water maintained at supercritical flow conditions while moving across said runner floor means and the front face of each vane is maintained substantially clear of water contact.

* * * * *